(12) United States Patent
Madril et al.

(10) Patent No.: US 8,612,706 B1
(45) Date of Patent: Dec. 17, 2013

(54) METADATA RECOVERY IN A DISK DRIVE

(75) Inventors: Abedon Madril, Thornton, CO (US);
Marcus A. Carlson, Berthoud, CO (US);
David C. Pruett, Longmont, CO (US);
Srinivas Neppalli, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 221 days.

(21) Appl. No.: 13/333,657

(22) Filed: Dec. 21, 2011

(51) Int. Cl.
*G06F 12/00* (2006.01)

(52) U.S. Cl.
USPC .......................................................... 711/162

(58) Field of Classification Search
None
See application file for complete search history.

(56) References Cited

U.S. PATENT DOCUMENTS

| | | |
|---|---|---|
| 5,450,560 A | 9/1995 | Bridges et al. |
| 5,574,882 A | 11/1996 | Menon et al. |
| 5,613,066 A | 3/1997 | Matsushima et al. |
| 5,680,538 A | 10/1997 | Jones et al. |
| 5,696,921 A | 12/1997 | Holt |
| 6,092,231 A | 7/2000 | Sze |
| 6,202,121 B1 | 3/2001 | Walsh et al. |
| 6,324,604 B1 | 11/2001 | Don et al. |
| 6,339,811 B1 | 1/2002 | Gaertner et al. |
| 6,501,905 B1 | 12/2002 | Kimura |
| 6,574,774 B1 | 6/2003 | Vasiliev |
| 6,675,281 B1 | 1/2004 | Oh et al. |
| 6,732,124 B1 | 5/2004 | Koseki et al. |
| 6,772,274 B1 | 8/2004 | Estakhri |
| 6,829,688 B2 | 12/2004 | Grubbs et al. |
| 6,886,068 B2 | 4/2005 | Tomita |
| 6,895,468 B2 | 5/2005 | Rege et al. |
| 6,901,479 B2 | 5/2005 | Tomita |
| 6,920,455 B1 | 7/2005 | Weschler |
| 6,967,810 B2 | 11/2005 | Kasiraj et al. |
| 6,970,987 B1 | 11/2005 | Ji et al. |
| 7,155,448 B2 | 12/2006 | Winter |
| 7,343,517 B2 | 3/2008 | Miller et al. |
| 7,406,487 B1 | 7/2008 | Gupta et al. |
| 7,408,731 B2 | 8/2008 | Uemura et al. |
| 7,412,585 B2 | 8/2008 | Uemura |
| 7,472,223 B1 | 12/2008 | Ofer |
| 7,486,460 B2 | 2/2009 | Tsuchinaga et al. |
| 7,490,212 B2 | 2/2009 | Kasiraj et al. |
| 7,509,471 B2 | 3/2009 | Gorobets |

(Continued)

FOREIGN PATENT DOCUMENTS

WO 2009/102425 8/2009

OTHER PUBLICATIONS

Amer, Ahmed et al. (May 2010) "Design Issue for a Shingled Write Disk System" 26th IEEE Symposium on Massive Storage Systems and Technologies: Research Track.

(Continued)

*Primary Examiner* — Hiep Nguyen (57) ABSTRACT

A disk drive subsystem is disclosed that implements a process for metadata recovery. Certain embodiments relate to recovery of metadata containing information indicating the physical locations in the disk drive in which host data is stored. In an embodiment, the metadata to be recovered is disposed in sequence with, or in physical association with host data that it describes. Recovery is accomplished by identifying metadata that is valid, but is absent from one or more translation tables containing translation information. Metadata portion can include one or more identifiers that are sequentially related to identifiers included in one or more other metadata portions. Performance improvements can thereby be attained.

27 Claims, 6 Drawing Sheets

(56) References Cited

U.S. PATENT DOCUMENTS

| | | | |
|---|---|---|---|
| 7,529,880 B2 | 5/2009 | Chung et al. | |
| 7,539,924 B1 | 5/2009 | Vasquez et al. | |
| 7,549,021 B2 | 6/2009 | Warren, Jr. | |
| 7,590,816 B2 | 9/2009 | Shinohara et al. | |
| 7,594,067 B2 | 9/2009 | Torabi | |
| 7,603,530 B1 | 10/2009 | Liikanen et al. | |
| 7,617,358 B1 | 11/2009 | Liikanen et al. | |
| 7,620,772 B1 | 11/2009 | Liikanen et al. | |
| 7,631,009 B1 * | 12/2009 | Patel et al. | 707/802 |
| 7,647,544 B1 | 1/2010 | Masiewicz | |
| 7,669,044 B2 | 2/2010 | Fitzgerald et al. | |
| 7,685,360 B1 | 3/2010 | Brunnett et al. | |
| 7,831,750 B2 | 11/2010 | Sampathkumar | |
| 7,840,878 B1 | 11/2010 | Tang et al. | |
| 7,860,836 B1 | 12/2010 | Natanzon et al. | |
| 7,876,769 B2 | 1/2011 | Gupta et al. | |
| 7,885,921 B2 | 2/2011 | Mahar et al. | |
| 7,903,659 B2 | 3/2011 | Sindhu et al. | |
| 7,996,645 B2 | 8/2011 | New et al. | |
| 8,006,027 B1 | 8/2011 | Stevens et al. | |
| 8,214,684 B2 * | 7/2012 | Hetzler et al. | 714/6.24 |
| 2002/0049886 A1 | 4/2002 | Furuya et al. | |
| 2003/0123701 A1 * | 7/2003 | Dorrell et al. | 382/100 |
| 2003/0220943 A1 | 11/2003 | Curran et al. | |
| 2004/0019718 A1 | 1/2004 | Schauer et al. | |
| 2004/0109376 A1 | 6/2004 | Lin | |
| 2004/0139310 A1 | 7/2004 | Maeda et al. | |
| 2005/0069298 A1 | 3/2005 | Kasiraj et al. | |
| 2005/0071537 A1 | 3/2005 | New et al. | |
| 2005/0144517 A1 | 6/2005 | Zayas | |
| 2005/0193035 A1 * | 9/2005 | Byrne | 707/202 |
| 2006/0090030 A1 | 4/2006 | Ijdens et al. | |
| 2006/0112138 A1 | 5/2006 | Fenske et al. | |
| 2006/0117161 A1 | 6/2006 | Venturi | |
| 2006/0181993 A1 | 8/2006 | Blacquiere et al. | |
| 2007/0174582 A1 | 7/2007 | Feldman | |
| 2007/0204100 A1 | 8/2007 | Shin et al. | |
| 2007/0226394 A1 | 9/2007 | Noble | |
| 2007/0294589 A1 | 12/2007 | Jarvis et al. | |
| 2008/0098195 A1 | 4/2008 | Cheon et al. | |
| 2008/0104308 A1 | 5/2008 | Mo et al. | |
| 2008/0168243 A1 | 7/2008 | Bychkov et al. | |
| 2008/0183955 A1 | 7/2008 | Yang et al. | |
| 2008/0183975 A1 | 7/2008 | Foster et al. | |
| 2008/0195801 A1 | 8/2008 | Cheon et al. | |
| 2008/0209144 A1 | 8/2008 | Fujimoto | |
| 2008/0250200 A1 | 10/2008 | Jarvis et al. | |
| 2008/0256287 A1 | 10/2008 | Lee et al. | |
| 2008/0256295 A1 | 10/2008 | Lambert et al. | |
| 2008/0270680 A1 | 10/2008 | Chang | |
| 2008/0307192 A1 | 12/2008 | Sinclair et al. | |
| 2009/0019218 A1 | 1/2009 | Sinclair et al. | |
| 2009/0055620 A1 | 2/2009 | Feldman et al. | |
| 2009/0063548 A1 | 3/2009 | Rusher et al. | |
| 2009/0070529 A1 | 3/2009 | Mee et al. | |
| 2009/0119353 A1 | 5/2009 | Oh et al. | |
| 2009/0144493 A1 | 6/2009 | Stoyanov | |
| 2009/0150599 A1 | 6/2009 | Bennett | |
| 2009/0154254 A1 | 6/2009 | Wong et al. | |
| 2009/0164535 A1 | 6/2009 | Gandhi et al. | |
| 2009/0164696 A1 | 6/2009 | Allen et al. | |
| 2009/0193184 A1 | 7/2009 | Yu et al. | |
| 2009/0198952 A1 | 8/2009 | Khmelnitsky et al. | |
| 2009/0204750 A1 | 8/2009 | Estakhri et al. | |
| 2009/0222643 A1 | 9/2009 | Chu | |
| 2009/0235042 A1 | 9/2009 | Petrocelli | |
| 2009/0240873 A1 | 9/2009 | Yu et al. | |
| 2009/0271581 A1 | 10/2009 | Hinrichs, Jr. | |
| 2010/0011275 A1 | 1/2010 | Yang | |
| 2010/0208385 A1 | 8/2010 | Toukairin | |
| 2010/0235678 A1 | 9/2010 | Kompella et al. | |
| 2010/0281202 A1 | 11/2010 | Abali et al. | |
| 2010/0318721 A1 | 12/2010 | Avila et al. | |
| 2011/0138145 A1 | 6/2011 | Magruder et al. | |
| 2011/0167049 A1 | 7/2011 | Ron | |
| 2011/0197035 A1 | 8/2011 | Na et al. | |

OTHER PUBLICATIONS

Rosenblum, Mendel and Ousterhout, John K. (Feb. 1992), "The Design and Implementation of a Log-Structured File System." ACM Transactions on Computer Systems, vol. 10, Issue 1, pp. 26-52.

Rosenblum, "The Design and Implementation of a Log-structured File System", EECS Department, University of California, Berkeley, Technical Report No. UCB/CSD-92-696, Jun. 1992.

Garth Gibson and Milo Polte, "Directions for Shingled-Write and Two-Dimensional Magnetic Recording System Architectures: Synergies with Solid-State Disks", Parallel Data Lab, Carnegie Mellon Univ., Pittsburgh, PA, Tech. Rep. CMU-PDL-09-014 (2009).

Denis Howe, "Circular Buffer Definition", 2010, The Free On-Line Dictionary of Computing, pp. 1-3, http://dictionary.reference.com/browse/circular+buffer.

The PC Guide, "Logical Block Addressing (LBA)", Sep. 2, 2000, pp. 1-2, http://web.archive.org/web/2000090203261 2/http://www.pcguide.com/ref/hdd/bios/modesLBA-c.html.

Robert Hinrichs, "Circular Buffer", Sep. 11, 2002, pp. 1-22, http://www.codeproject.com/Articles/2880/Circular-Buffer.

Margaret Rouse, "Logical Block Addressing (LBA)", Apr. 2005, pp. 1-16, http://searchcio-midmarket.techtarget.com/definition/logical-block-addressing.

* cited by examiner

METADATA RECOVERY IN A DISK DRIVE

BACKGROUND

1. Technical Field

This disclosure relates to data recovery in memory storage systems. More particularly, the disclosure relates to systems and methods for recovering metadata in a disk drive system.

2. Description of the Related Art

Updating file systems to reflect changes to files and directories may require multiple separate write operations. As a result, interruptions may occur between write operations, such as a power failure or system crash, leaving data structures in an intermediate or invalid state. Journaling, and various other techniques, attempt to provide more accurate and/or efficient recovery from a system failure event. Journaling file systems keep track of changes to be made in a journal before committing them to the main file system. There is a need for more efficient and/or effective methods of data recovery in disk drives, such as shingled disk drives.

BRIEF DESCRIPTION OF THE DRAWINGS

Systems and methods that embody the various features of the invention will now be described with reference to the following drawings, in which.

DETAILED DESCRIPTION OF SPECIFIC EMBODIMENTS

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

A disk drive may contain one or more translation tables that contain translation information mapping logical addresses used by a host system to access a disk drive to physical locations or addresses in the disk drive. For example, the host can access the disk drive (e.g., to store and/or retrieve data) as a linear array of logical block addresses (LBA's), and the disk drive can utilize a translation table to map the logical block addresses to physical locations on a magnetic disk where host data is stored. Translation tables can be used by the disk drive to locate host data stored in the drive. In addition, the disk drive can be configured to store metadata information used by the disk drive to keep track of locations where host data is stored. For example, metadata for a particular track can include the mapping of logical addresses for which host data is stored on the track to physical addresses where host data is stored. Typically, the host system does not use metadata information. Instead, metadata information is used by the disk drive to locate host data stored in the disk drive. In an embodiment of a system including a shingled disk drive, at least two tables are maintained, namely a translation table and a shingled zone table.

Translation information may be saved at regular time intervals to avoid data loss due to system failure. If interruption occurs between saving events, some translation information may be lost. Therefore, the drive may not be able to locate and access logical addresses that were written after the last successful save.

In some embodiments of the present invention, metadata information stored in nonvolatile storage regions (e.g., tracks, sectors, etc.), are utilized to store translation information that can be recovered after a system failure, such as an unexpected power loss. Metadata information is also referred to as Write Logs ("WL's") in this disclosure. In an embodiment, a WL is associated with a portion of host data stored on the track on which the WL is also stored. Locating and interpreting stored WL's provides a mechanism for reconstructing translation tables following a system failure.

System Overview

Figures 1A, 1B:
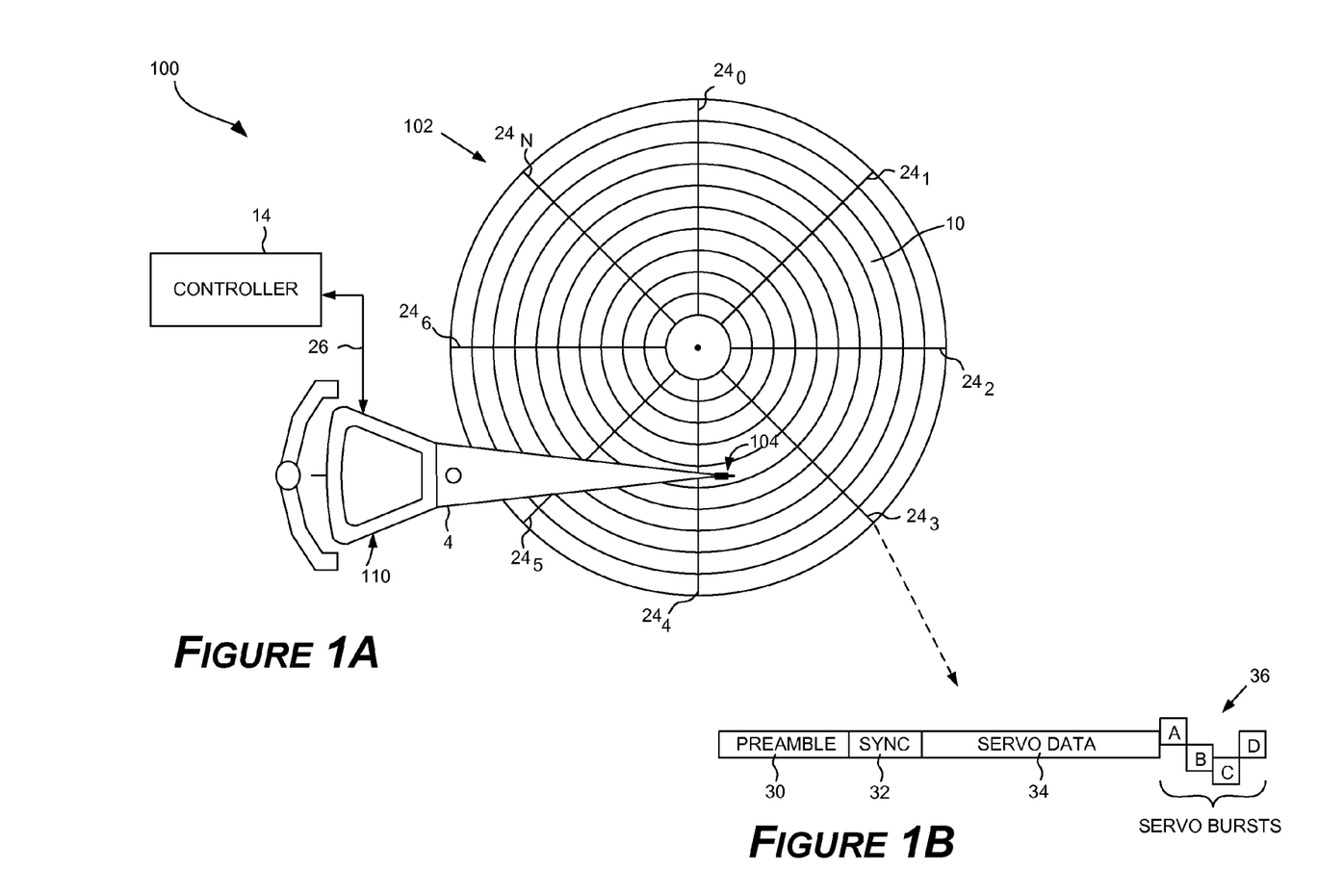
FIG. 1A illustrates a disk drive according to one embodiment of the invention.
FIG. 1B illustrates the format of a servo sector according to one embodiment of the invention.

FIG. 1A illustrates a disk drive 100 according to one embodiment of the invention. Disk drive 100 comprises a disk 102, an actuator arm 4, and a head 104 actuated radially over the disk 102 and connected to a distal end of the actuator arm 4. The disk 102 comprises a plurality of data tracks 10 and a controller 14 configured to control the actual arm 4 to position the head 104 over a target track.

In one embodiment, the disk 102 comprises a plurality of servo sectors $24_0$-$24_N$ that define the plurality of data tracks 10. The controller 14 processes the read signal to demodulate the servo sectors $24_0$-$24_N$ into a position error signal (PES). The PES is filtered with a suitable compensation filter to generate a control signal 26 applied to a voice coil motor (VCM) 110 which rotates the actuator arm 4 about a pivot in order to position the head 104 radially over the disk 102 in a direction that reduces the PES. The servo sectors $24_0$-$24_N$ may comprise any suitable position information, and in one embodiment, as is shown in FIG. 1B, each servo sector comprises a preamble 30 for synchronizing gain control and timing recovery, a sync mark 32 for synchronizing to a data field 34 comprising coarse head positioning information such as a track number, and servo bursts 36 which provide fine head positioning information. The coarse head position information is processed to position a head over a target track during a seek operation, and the servo bursts 36 are processed to maintain the head over a centerline of the target track while writing or reading data during a tracking operation.

Figure 2:
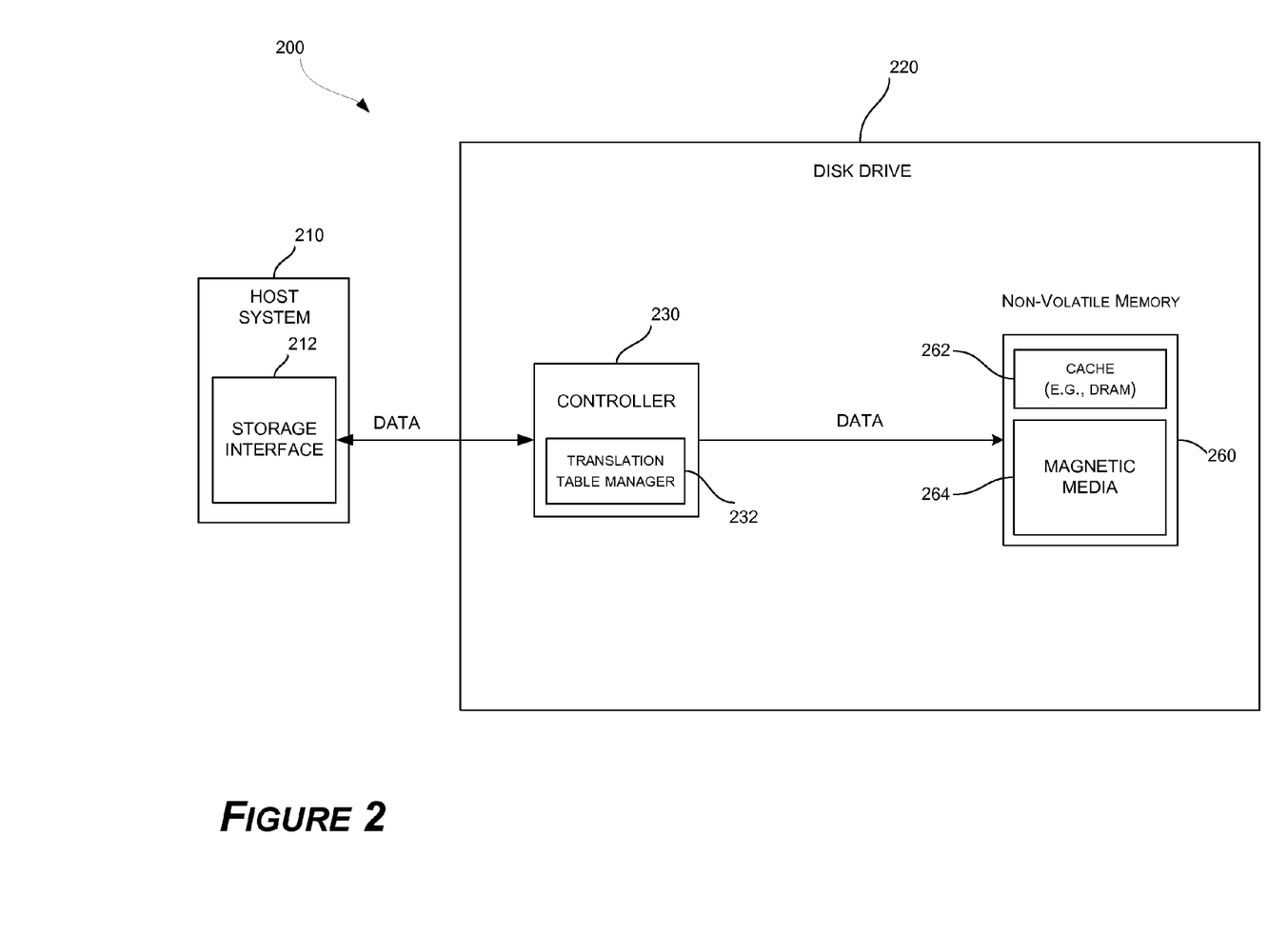
FIG. 2 is a block diagram illustrating a storage system that implements metadata recovery according to one embodiment of the invention.

FIG. 2 illustrates a storage system 200 that implements metadata recovery in accordance with one or more embodiments disclosed herein. As shown, a storage system 220 (e.g., a disk drive) includes a controller 230, and nonvolatile memory or storage 260, which comprises magnetic media 264 (e.g., disk 102) and cache 262 (e.g., DRAM). In one embodiment, non-volatile memory storage 260 is a shingled disk drive. The controller 230 can be configured to receive data and/or storage access commands from a storage interface 212 (e.g., a device driver) in a host system 210. Storage access commands communicated by the storage interface 212 can include write and read commands issued by the host system 210. Read and write commands can specify a logical block address in the storage system. The controller 230 can execute the received commands in the nonvolatile storage 260. In one embodiment, the controller 230 can include memory (e.g., DRAM) for storing data, such as system tables.

Storage system 220 can store data communicated by the host system 210. That is, the storage system 220 can act as memory storage for the host system 210. To facilitate this function, the controller 230 can implement a logical interface. The logical interface can present to the host system 210 the memory of storage system 220 as a set of logical addresses (e.g., contiguous address) where data can be stored. Internally, the controller 230 can map logical addresses to various physical memory addresses in the magnetic media 264.

In an embodiment where the memory 260 comprises a shingled drive, the storage system 220 uses a translation table containing known addresses within the memory 260 where host data is stored. In an embodiment, system 200 accomplishes recovery of lost translation information by identifying metadata information stored in non-volatile memory 260 that is valid but absent from the translation table containing known addresses within the memory 260 where host data is stored. In one embodiment, controller 230 includes a translation table manager 232 that may control storage and/or recovery of metadata in accordance with one or more embodiments disclosed herein. Recovered metadata content may be presented to the translation table manager 232 for inclusion in a database of known physical locations in the nonvolatile memory 260 where host data is stored (e.g., the translation table). If the translation table is missing any translation information due to, for example, an unexpected power interruption, the presented information recovered from the metadata may be used to recover such missing translation information.

Metadata Storage

Figure 3A:
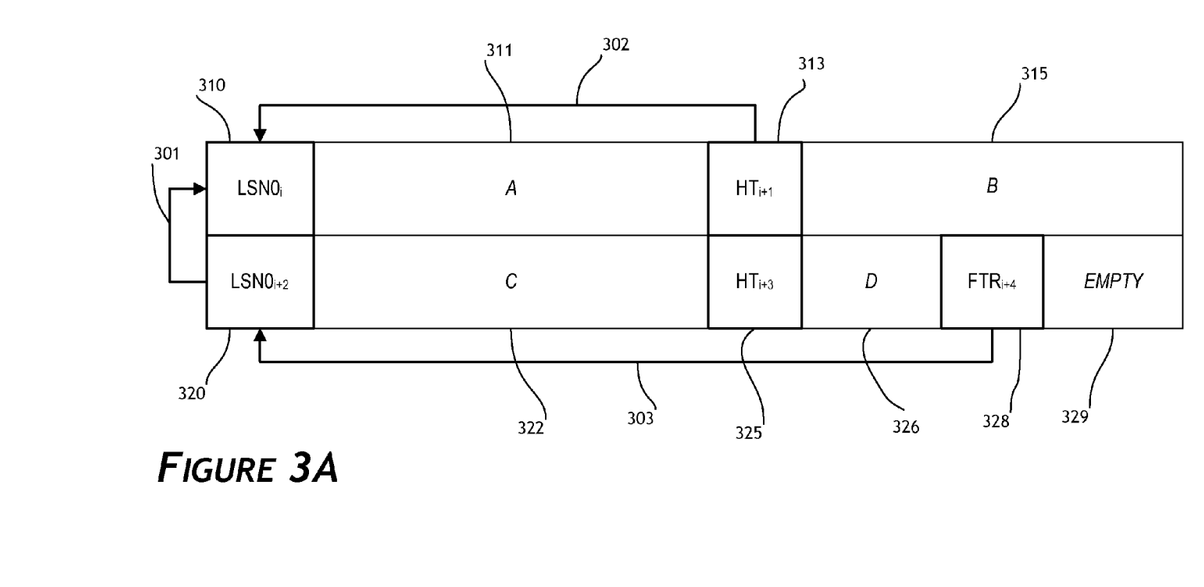
FIGS. 3A and 3B are block diagrams representing metadata storage configurations according to embodiments of the invention.
Figure 3B:
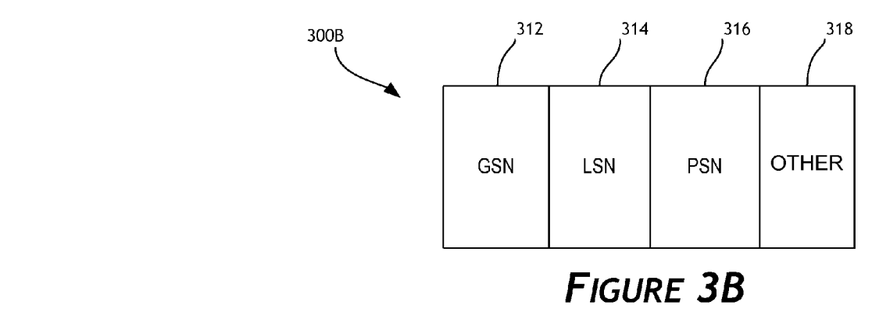

FIGS. 3A and 3B depict block diagrams representing metadata storage configurations according to one or more embodiments disclosed herein. FIG. 3A shows a plurality of metadata regions (310, 313, 320, 325, and 328) that describe, or relate to, certain host data written to one or more tracks of a non-volatile storage device. Metadata may be stored in such a manner in the magnetic media 264, described above with respect to FIG. 2. In an embodiment, metadata is written in sequence with, or in relationship to, host data that it describes. In one embodiment, metadata information is generated and stored by the controller 230 (e.g., translation table manager 232) when it processes write data storage operation(s) received from the host system 210.

In one embodiment, metadata portions, referred to herein as write-logs ("WL's") for convenience, are labeled or characterized using one or more identifiers in order to provide a mechanism for identifying valid WL's. One or more identifiers may provide information indicating whether a WL exists within one or more translation tables, or whether it exists within a range of valid records stored within one or more translation tables. In an embodiment, the one or more identifiers are sequence numbers that relate to one or more identifiers of another WL.

FIG. 3B shows an embodiment of a WL 300B including three identifiers, GSN 312, LSN 314, and PSN 316. As used herein, the terms "GSN," "LSN," "PSN" and "PGSN," as well as any related terms, are used for convenience as examples only to identify identifiers stored in a WL. Use of such terms is not limiting in any way on the scope or purpose of features discussed in connection with FIGS. 3A and 3B, or other embodiments disclosed herein. WL 300B may also include one or more additional portions 318 of storage space that may be utilized for other purposes, or may be left unutilized.

In an embodiment, GSN 312 (i.e., "global sequence number") is an identifier that is unique across sub-sections (e.g., "zones") within a given partition of a memory storage system (e.g., magnetic media 264). GSN 312 may be only unique within the partition in which it resides. In an embodiment, LSN 314 (i.e., "local sequence number") is an identifier that is local with respect to a subsection, or zone, in which it resides. For example, LSN 314 may be only unique within a single zone. In an embodiment, PSN 316 (i.e., "physical sector number") identifies another WL. For example, PSN 316 may identify a GSN of a previously recorded WL. Alternatively, PSN 316 may be referred to as, among possibly other things, "PGSN," or "previous global sequence number," relating to the source of its contents, which may be a GSN assigned to a previously recorded WL. In an embodiment, the GSN and/or LSN are implemented as incrementing or decrementing values. These values may provide a relative point of creation between WL's. In certain embodiments, the combination of the GSN and LSN can provide for sequential ordering of WL's created within a given partition.

In an embodiment, different types of WL's may be utilized for logging transactions in a disk drive, such as a shingled disk drive. For example, as shown in FIG. 3A, three different types of WL's may be used. The embodiment depicted in FIG. 3A includes a first type of WL 310, 320, referred to for convenience only as "LSN0." In an embodiment, this first type of WL is located at, or near, the head of a data track. Therefore, in such embodiments, this type of WL may be referred to as a "Header" WL. Alternatively, the WL's of this first type may be located at, or near, an end portion of a data track, or at some other suitable location. However, as used herein, "Header" may refer to WL's of this type, whether located at the head of a data track, end of a track, or at any other location. In the embodiment of FIG. 3A, Header WL 310 is associated with host data located, at least partially, in data region 311. That is, Header WL 310 contains translation information indicating the physical location of data stored in data region 311.

The embodiment depicted in FIG. 3A includes a second type of WL 313, 325, referred to in FIG. 3A, for convenience only, as "HT." In an embodiment this second type of WL 313, 325 is located at, or near, a mid-point of a data track. Therefore, this type of WL may be referred to as a "Halftrack" WL. Alternatively, WL's of this type may be located at other suitable locations. However, as used herein, "Halftrack" may refer to WL's of this type, wherever located. Halftrack WL 313 may describe, or be associated with host data stored in data portion 315, while Halftrack 325 may be associated with host data stored in data portion 326.

The embodiment depicted in FIG. 3A further includes a third type of WL 328, referred to in FIG. 3A, for convenience only, as "FTR." In an embodiment this third type of WL 328 is stored at a location other than the head, mid-point, and/or end of a data track. This type of WL, referred to below for convenience only as a "Footer" WL, may be stored as a means of signaling the end of a write command, such as to cap-off, or encompass, the write command. For example, a "Footer" WL can be generated and stored when host data stored on the track does not fill up the entire track. FIG. 3A shows a data portion 329 that may not contain host data when the data track has not been entirely filled up.

As described above, one or more of the WL's shown in FIG. 3A may include an identifier, such as a PSN, that identifies, or points to, a Header WL. A PSN may identify, or point to, another WL by identifying the GSN, or other information associated with, the other WL. In one embodiment, the PSN of a Header WL points to a previously recorded Header WL in the same zone. For example, the PSN may point to the Header WL recorded sequentially prior to the Header WL comprising the PSN. This relationship is shown in FIG. 3A by arrow 301. As shown, Header WL 320, which points to Header WL 310, describes, or is associated with, host data stored in data portion 322.

A Halftrack PSN may point to a Header WL at the head of the track on which the Halftrack WL is located. This relationship is shown in FIG. 3A by arrow 302. In an embodiment, a Halftrack PSN may identify a Header (i.e. "LSN0") WL located at or near the end of the track. The PSN of a Footer WL may similarly point to a Header WL at or near the head (or end) of the track on which it is located. This relationship is shown in FIG. 3A by arrow 303.

Figure 4:
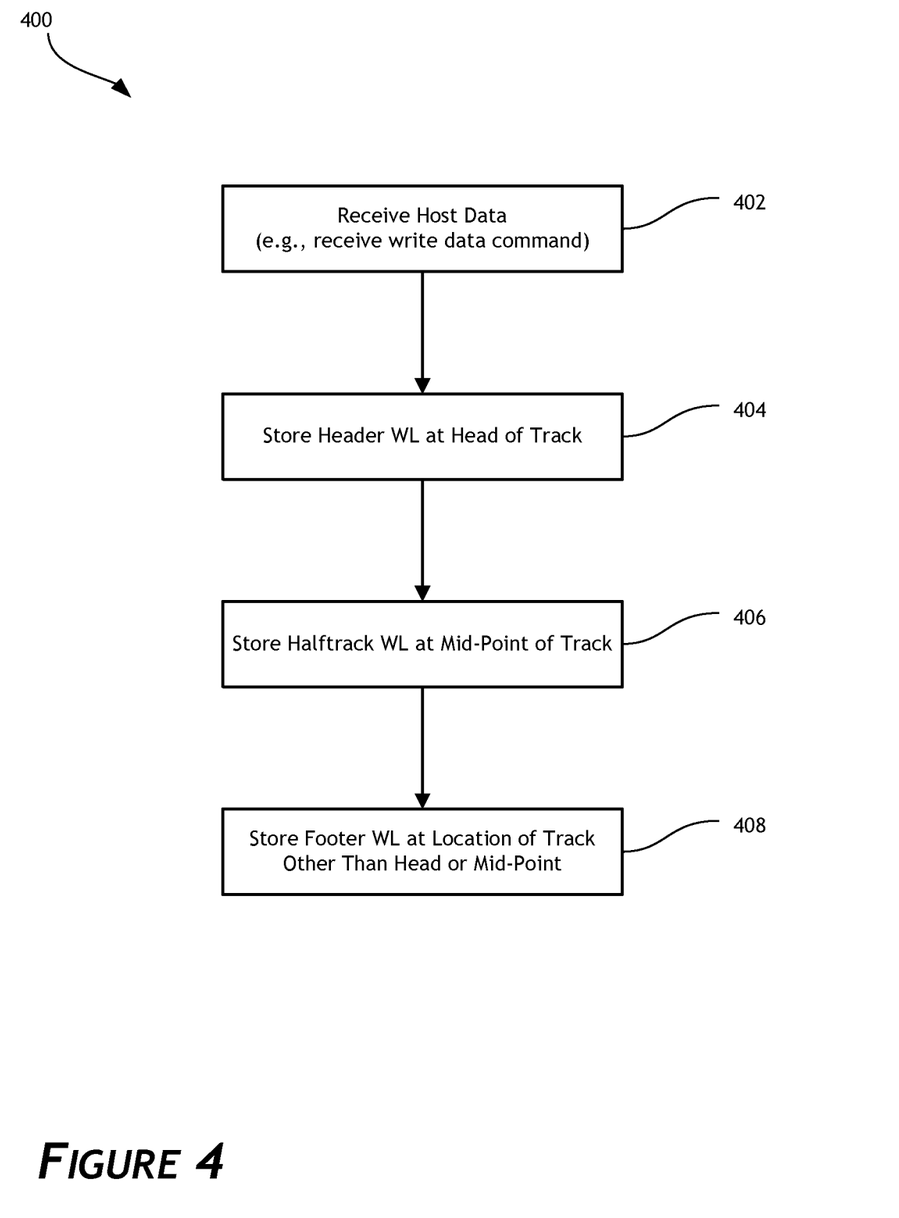
FIG. 4 is a flow diagram illustrating a process for storing metadata in a disk drive according to one embodiment of the invention.

FIG. 4 is a flow diagram illustrating an embodiment of a process for recording metadata in a disk drive. The process 400 can be implemented by the controller 230 of a storage system 220, as described above in connection with FIG. 2. For example, the process 400 may be implemented by translation table manager 232. The process 400 includes receiving host data from a host system at block 402. For example, a storage system may receive a write command from the host system to write host data in non-volatile memory, such as, for example, non-volatile memory 260, shown in FIG. 2. Process 400 further includes storing a Header WL at or near the head of a data track, or at some other suitable location within the storage system. This step is performed at block 404. As discussed above, the WL may contain one or more identifiers, such as sequence values, for determining the validity of the WL, or of another WL. At block 404, a Halftrack WL may also be stored at or near a mid-point of the data track, or at some other suitable location. In an embodiment, the Halftrack WL includes an identifier that identifies the Header WL stored at block 404. At block 408, a Footer WL may be stored at a location other than the head or mid-point of the track. It may be desirable to store the Footer WL in order to signal the end of a write command. Such information may be useful in determining where host data associated with a write command terminates.

Metadata Recovery

Figure 5:
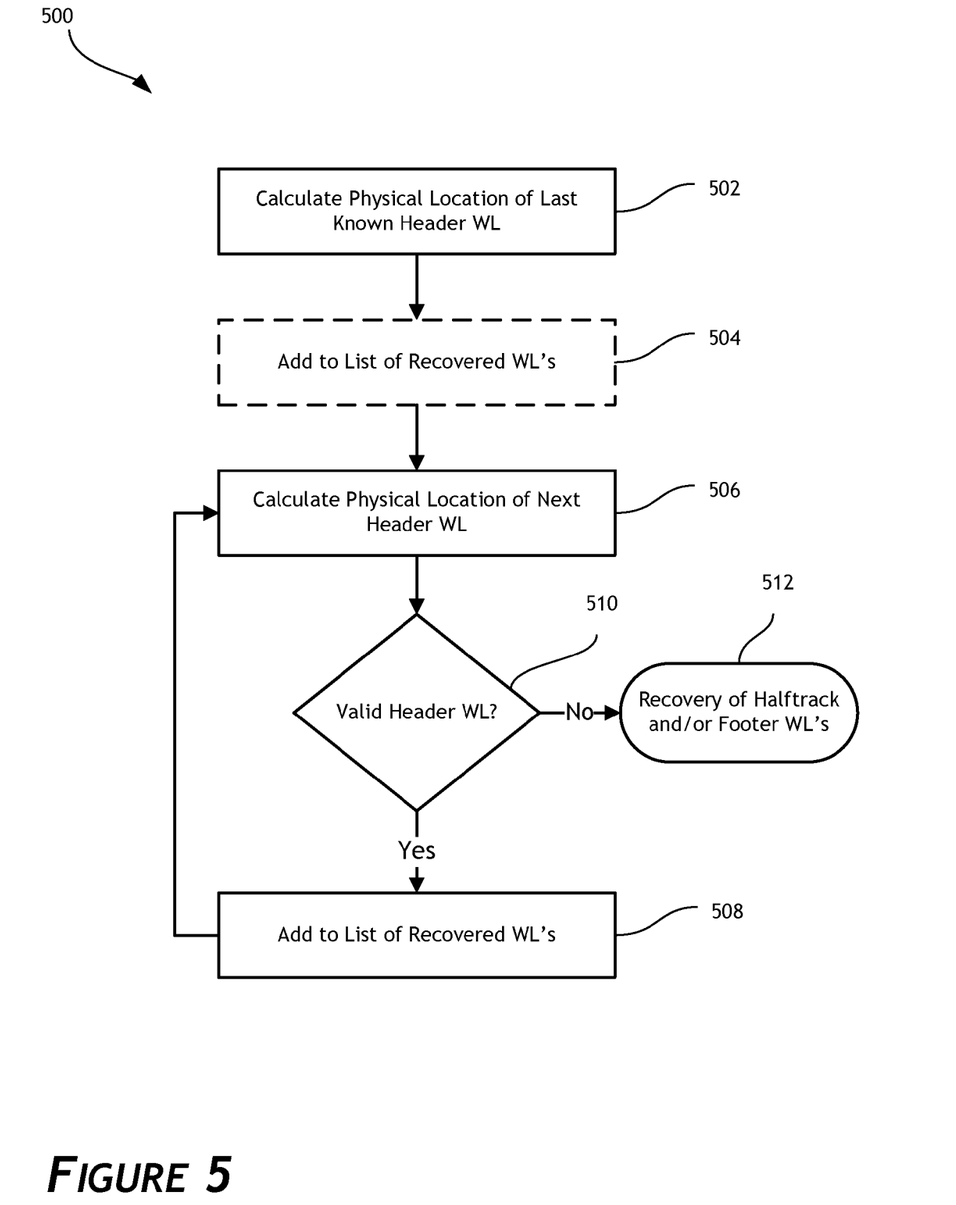
FIG. 5 is a flow diagram illustrating a process for recovering metadata in a disk drive according to one embodiment of the invention.

FIG. 5 is a flow diagram illustrating a process 500 for recovering metadata in a disk drive in accordance with one or more embodiments disclosed herein. Process 500 may be performed in order to recover data after a system failure event of some kind, such as an unexpected power loss. The process 500 can be implemented by the controller 230 of a storage system 220, as described above in connection with FIG. 2. For example, the process 500 may be implemented by translation table manager 232. The process 500 may include calculating the physical location, or address, of the last known Header WL, as shown in block 502. For example, such a step may be performed after a previous state of the disk drive has been restored. The last known Header WL may be, for example, the last Header WL that was saved to non-volatile storage prior to an unexpected power loss event. At block 504, the last known Header WL may be added to a list of recovered WL's. In an embodiment, the last known Header WL is not added to the list of recovered WL's. For example, as the WL may already be contained in non-volatile storage, it may be unnecessary, or undesirable, to store a redundant copy of the WL. This step is depicted as block 504.

Process 500 may further include calculating the physical location of a next Header WL. This step is performed at block 506. If it is determined, at block 510, that this Header WL is valid, it is added to the list of recovered WL's at block 508, and the process 500 continues calculating addresses and determining the validity of Header WL's until an invalid Header WL is found. Determining whether a given Header WL is valid may involve reading one or more identifiers stored in the WL and determining whether the one or more identifiers contain an expected value. Determining that there are no additional Header WL's to recover may involve reading ahead a certain number of tracks, or WL's, in order to confirm invalidity. In an embodiment, determining that any WL's following the WL that is the subject of a validity determination at block 510 are relics, based on comparisons between certain identifiers, such as GSN, LSN, and/or PSN identifiers, indicates that there are no further Header WL's to recover. In an embodiment, no further Header WL's are recovered, and the recovery process 500 is at least temporarily terminated, in response to a memory buffer shortage, which may result in an inability to store recovered WL's in local memory.

Once the latest valid Header WL has been found (e.g., an invalid Header WL has been read at block 510), the process 500 may terminate, or may turn to the recovery of a Halftrack and/or Footer WL's lying within the track headed by the latest valid Header WL. This step is shown at block 512.

Figure 6:
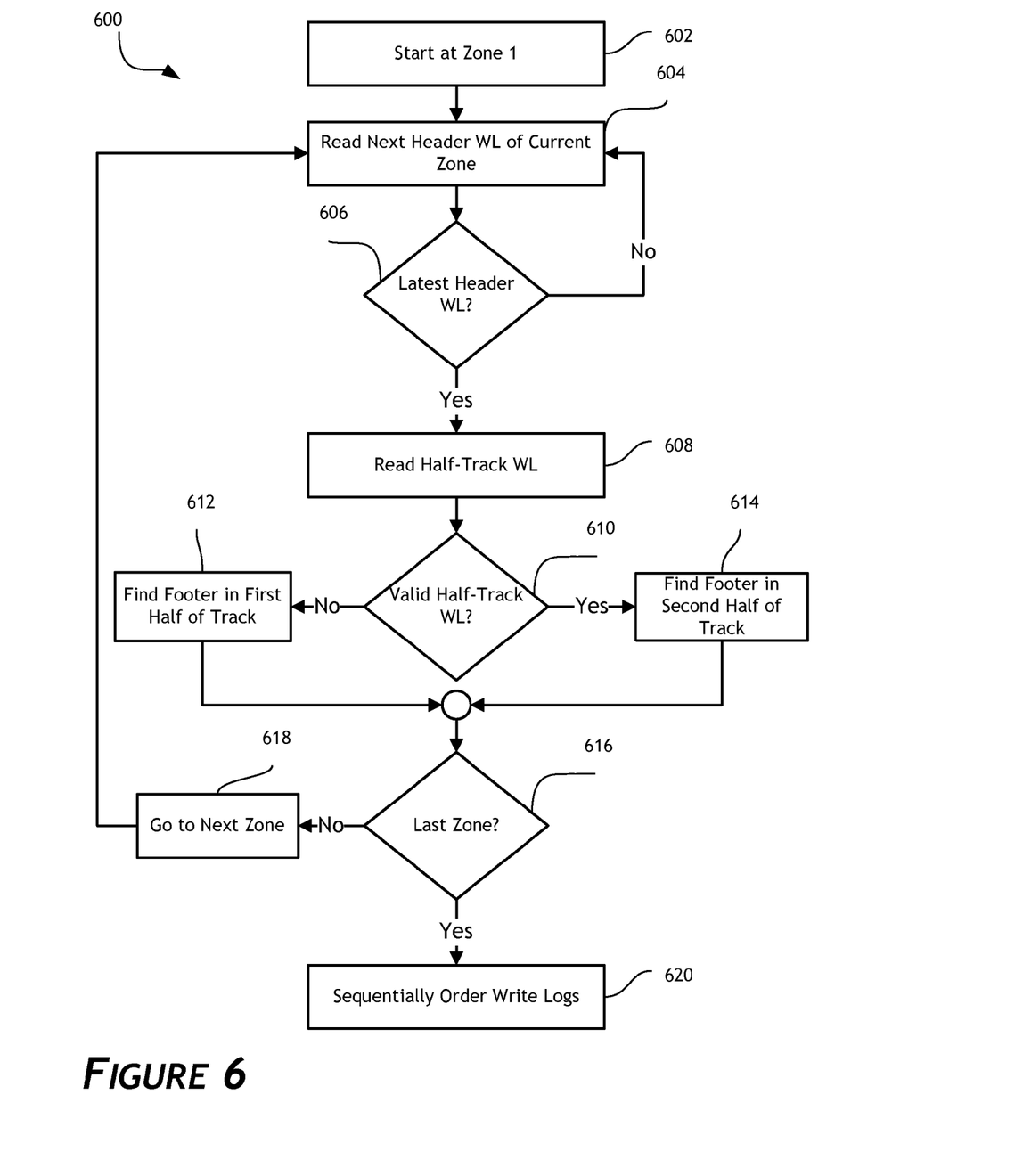
FIG. 6 is a flow diagram illustrating a process for recovering metadata in a disk drive according to another embodiment of the invention.

FIG. 6 is a flow diagram illustrating a process 600 for recovering metadata in a disk drive according to one or more embodiments disclosed herein. Process 600 may be performed in order to recover data after a system failure event of some kind, such as an unexpected power loss. The process 600 can be implemented by the controller 230 of a storage system 220, as described above in connection with FIG. 2. For example, the process 600 may be implemented by translation table manager 232. The process begins in a partition, or zone, that may contain lost translation information (e.g., translation information lost due to a power loss event). In an embodiment, the process 600 begins in a first zone 602 of the disk drive. The process 600 may include locating the latest valid Header WL in the current zone of recovery, as performed at blocks 604 and 606, possibly in a similar manner to that described above with respect to FIG. 5.

Once the latest Header has been found, a Halftrack WL is read at block 608 that is located on the track of the latest valid Header. At block 610, it is determined whether the Halftrack WL is valid. If the Halftrack WL is not valid, the process 600 includes searching for a Footer WL in at least a portion of one half of the track on which the Halftrack is located, such as in the first half of the track, as shown in block 612. This may be desirable based on a determination that, because not enough host data was saved on the track to merit storing a Halftrack WL associated with such data, the Footer is likely located in a position between the Header WL and where the Halftrack WL would have been saved. In an embodiment, if it is determined that the Halftrack WL is valid, the at least a portion of the other half of the track is searched, such as the latter half of the track, for example.

Once the Footer is located at either block 612 or 614, recovery in the current zone is complete. Determination of whether additional zones are to be interrogated is made at block 620. If so, the process 600 proceeds to a next zone and performs at least one or more steps of the process again in connection with the next zone. Block 618 indicates this progression.

When all zones of interest have been interrogated, it may be desirable to sequentially order recovered WL's. This may be desirable in certain disk drive system embodiments that implement a data storage routine that alternates, or jumps, between zones when storing host data. In such cases, it is desirable to identify disk drive locations that store host data that was written last. In other words, these disk drive locations store last and valid copies of host data.

CONCLUSION

Translation tables containing translation information mapping logical addresses used by a host system to access a disk drive to physical locations or addresses in the disk drive may require recovery or restoration following certain system failure events. A disk drive can be configured to store metadata information that aids in the recovery of translation information. For example, metadata for a particular track can include the mapping of logical addresses for which host data is stored on the track to physical addresses where host data is stored. Translation information may be saved at regular intervals of time to avoid data loss due to system failure. If, for example, interruption occurs between saving events, metadata recovery according to one or more embodiments disclosed herein may provide for at least partial recovery of lost data.

In some embodiments of the present invention, metadata portions, or write-logs ("WL's"), in nonvolatile storage regions, or sectors, are utilized to store translation information that can be recovered after a system failure, such as an unexpected power loss. In an embodiment, a WL is associated with a portion of data stored on the track on which the WL is also stored. Locating and interpreting, stored WL's provides a mechanism for reconstructing translation tables following a system failure. Performance improvements can thereby be attained.

Other Variations

Those skilled in the art will appreciate that in some embodiments, other types of metadata recovery can be implemented. In addition, the actual steps taken in the processes shown in FIGS. 4-6 may differ from those shown in the figures. Depending on the embodiment, certain of the steps described above may be removed, others may be added. Accordingly, the scope of the present disclosure is intended to be defined only by reference to the appended claims.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method of recovering metadata information stored in a disk drive device comprising a plurality of zones, each zone comprising a plurality of tracks configured to store one or more write-logs containing metadata, the method comprising:

determining a physical address for a first write-log of a first type, wherein the physical address of the first write-log of the first type is located in a first zone;

determining a physical address for a second write-log of the first type, wherein the physical address of the second write-log of the first type is located in the first zone;

determining whether the second write-log is associated with a last write operation received from a host system prior to a power loss event; and adding the second write-log of the first type to a list of recovered write-logs associated with the first zone;

wherein the method is performed by the disk drive device.

2. The method of claim 1, further comprising determining whether the second write-log of the first type is valid.

3. The method of claim 2, further comprising:

when it is determined that the second write-log of the first type is not valid, determining a physical address for a third write-log of the first type; and determining whether the third write-log is valid.

4. The method of claim 3, further comprising confirming that a predetermined number of write-logs subsequent to the third write-log are invalid when it is determined that the second write-log of the first type is not valid.

5. The method of claim 2, wherein determining whether the second write-log of the first type is valid comprises determining whether the second write-log includes a valid write-log signature.

6. The method of claim 5, wherein determining whether the second write-log includes a valid write-log signature comprises determining whether the second write-log includes a value associated with an identifier that is unique across the plurality of zones.

7. The method of claim 1, wherein determining whether the second write-log is associated with the last write operation received from the host system prior to the power loss event comprises determining that a third write log is not valid.

8. The method of claim 1, wherein the second write-log of the first type is sequentially ordered after the first write-log in the list of recovered write-logs.

9. The method of claim 1, further comprising attempting to locate a write-log of a second type on a track on which the second write-log of the first type is located when it is determined that the second write-log is associated with the last write operation received from the host system prior to the power loss event.

10. The method of claim 9, further comprising adding the write-log of the second type to the list of recovered write-logs when the write-log of a second type is located on the track.

11. The method of claim 9, further comprising attempting to locate a write-log of a third type on the track.

12. The method of claim 11, wherein attempting to locate the write-log of the third type comprises:

when the write-log of the second type is located on the track, scanning a first portion of the track, and when the write-log of the second type is not located on the track, scanning a second portion of the track separate from the first portion.

13. The method of claim 11, wherein the first write-log of the first type is a header write-log, the write-log of the second type is a halftrack write-log, and the write-log of the third type is a footer write-log.

14. A method of storing metadata information on a data track located within a first zone of a non-volatile storage medium, the method comprising:

receiving host data from a host system;

storing a first write-log of a first type in a first metadata portion of the data track; and storing a write-log of a second type in a second metadata portion of the data track;
wherein each write-log includes or is stored in association with:
a first identifier that is unique across at least the first zone and a second zone of the non-volatile storage medium, and
a second identifier that is unique within the first zone.

15. The method of claim 14, further comprising storing a write-log of a third type in a third metadata portion of the data track.

16. The method of claim 14, wherein the first metadata portion of the data track is located substantially at the head of the data track and the second metadata portion of the data track is located substantially at a mid-point of the data track.

17. The method of claim 14, wherein each write-log further comprises a third identifier that identifies either the first write-log of the first type, or a second write-log of the first type.

18. The method of claim 17, wherein the third identifier of the write-log of the second type identifies the first write-log of the first type.

19. The method of claim 15, wherein the third identifier of the write-log of the third type identifies the first write-log of the first type.

20. The method of claim 17, wherein the third identifier of the first write-log of the first type identifies the second write-log of the first type.

21. The method of claim 14, wherein the first identifier of the write-log of the second type comprises a first value that is sequential with respect to the first identifier of the first write-log of the first type, and the second identifier of the write-log of the second type comprises a second value that is sequential with respect to the second identifier of the first write-log of the first type.

22. The method of claim 15, wherein the first identifier of the write-log of the third type is incrementally greater than the first identifier of the write-log of the second type, and the second identifier of the write-log of the third type is incrementally greater than the second identifier of the write-log of the second type.

23. A disk drive comprising:
a magnetic storage medium comprising a plurality of zones, each zone comprising a plurality of tracks configured to store one or more write-logs containing metadata; and
a controller configured to:
determine a physical address for a first write-log of a first type, wherein the physical address of the first write-log of the first type is located in a first zone;
determine a physical address for a second write-log of the first type, wherein the physical address of the second write-log of the first type is located in the first zone;
determine whether the second write-log is associated with a last write operation received from a host system prior to a power loss event; and
add the second write-log of the first type to a list of recovered write-logs associated with the first zone.

24. The disk drive of claim 23, wherein the controller is further configured to attempt to locate a write-log of a second type on a track on which the second write-log of the first type is located when it is determined that the second write-log is associated with the last write operation received from the host system prior to the power loss event.

25. The disk drive of claim 24, wherein the controller is further configured to add the write-log of the second type to the list of recovered write-logs when the write-log of a second type is located on the track.

26. The disk drive of claim 24, wherein the controller is further configured to attempt to locate a write-log of a third type on the track.

27. The disk drive of claim 26, wherein the controller attempts to locate the write-log of the third type by:
when the write-log of the second type is located on the track, scanning a first portion of the track, and
when the write-log of the second type is not located on the track, scanning a second portion of the track separate from the first portion.

* * * * *